(12) United States Patent
Keast et al.

(10) Patent No.: US 11,639,080 B2
(45) Date of Patent: May 2, 2023

(54) VEHICLE SUSPENSION KIT HAVING MULTI-PURPOSE SHOCK ABSORBER AND RELATED

(71) Applicant: Larry G. Keast, Houston, TX (US)

(72) Inventors: Larry G. Keast, Houston, TX (US); Thomas Schubert, Houston, TX (US); Jonathan Goudy, Florissant, CO (US)

(73) Assignee: Larry G. Keast, Houston, TX (US)

( * ) Notice: Subject to any disclaimer, the term of this patent is extended or adjusted under 35 U.S.C. 154(b) by 0 days.

(21) Appl. No.: 17/530,167

(22) Filed: Nov. 18, 2021

(65) Prior Publication Data

US 2022/0153080 A1 May 19, 2022

Related U.S. Application Data

(60) Provisional application No. 63/115,250, filed on Nov. 18, 2020.

(51) Int. Cl.
*B60G 17/018* (2006.01)
*B60G 17/015* (2006.01)
*B60R 19/48* (2006.01)

(52) U.S. Cl.
CPC ....... *B60G 17/018* (2013.01); *B60G 17/0155* (2013.01); *B60R 19/48* (2013.01); *B60G 2202/15* (2013.01); *B60G 2202/416* (2013.01); *B60G 2204/20* (2013.01); *B60G 2500/201* (2013.01); *B60G 2500/30* (2013.01)

(58) Field of Classification Search
CPC ............. B60G 17/018; B60G 17/0155; B60G 2202/15; B60G 2202/416; B60G 2204/20; B60G 2500/20; B60R 19/48
See application file for complete search history.

(56) References Cited

U.S. PATENT DOCUMENTS

| | | | | |
|---|---|---|---|---|
| 4,674,768 A * | 6/1987 | Morra | ...................... | G01B 7/02 73/117.03 |
| 5,125,681 A * | 6/1992 | Brackette, Jr. | ... | B60G 17/01933 280/DIG. 1 |
| 5,251,729 A * | 10/1993 | Nehl | .................... | B60G 17/019 188/322.12 |
| 5,396,973 A * | 3/1995 | Schwemmer | ............. | F16F 9/38 188/266.2 |
| 6,401,883 B1* | 6/2002 | Nyce | ...................... | G01D 5/485 188/266 |
| 10,690,215 B2* | 6/2020 | Sakka | ........................ | F16F 9/18 |
| 2002/0100649 A1* | 8/2002 | Agrotis | ................. | F16F 9/3292 188/284 |
| 2020/0238780 A1* | 7/2020 | Dhaens | .................. | B60G 17/08 |

* cited by examiner

*Primary Examiner* — Toan C To
(74) *Attorney, Agent, or Firm* — Kearney, McWilliams & Davis, PLLC; John M. DeBoer

(57) ABSTRACT

A multi-purpose shock absorber for a vehicle suspension having an absorber body with an outer surface, and a movable piston having a first end disposed within the absorber body and a second end configured to couple with a part of the vehicle. There is a magnet assembly disposed around and external of the movable piston at the second end. The absorber has a sensor assembly having a sensor body coupled with the outer surface. An inner sensor body has a sensor disposed therein configured to detect a linear change in a position of the magnet assembly.

17 Claims, 7 Drawing Sheets

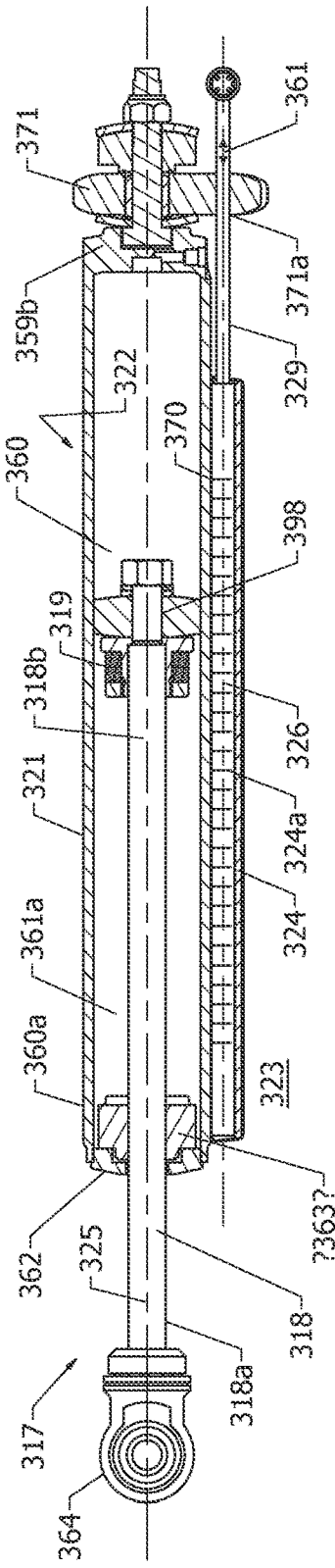
Figure 3A
Figure 3B
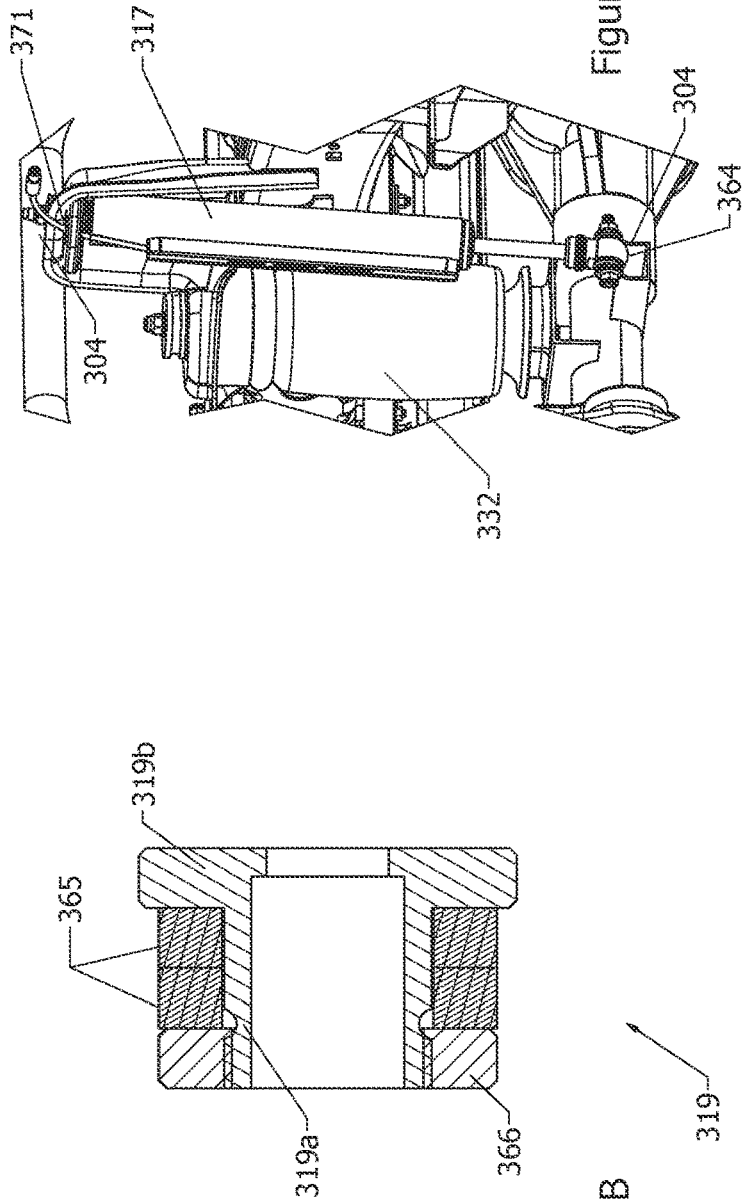
Figure 3C

VEHICLE SUSPENSION KIT HAVING MULTI-PURPOSE SHOCK ABSORBER AND RELATED

BACKGROUND

Field of the Disclosure

This disclosure generally relates to a vehicle modification kit having a multi-purpose shock absorber. In particular embodiments, the disclosure relates to an air suspension kit that includes a shock absorber configured with a hall effect sensor.

Background of the Disclosure

As anyone who as ever rode in a vehicle would know, a bumpy ride makes for an unpleasant ride. To smooth the experience, a typical vehicle has a conventional spring and shock absorber system used to reduce shock or concussion when the vehicle strikes a bump or encounters rough terrain in the surface of the road. The shock absorber is mounted between the automobile frame and the axles, and usually entails a piston and some form of dampener inside a cylinder partially filled with fluid.

When the wheel hits the bump, instead of the axle communicating the shock directly to automobile frame, the piston is pushed upwardly or downwardly. The fluid in the cylinder, with or without additional shock dampening means, resists and decelerates the movement of the piston thus offsetting the force of the bump. The hydraulic fluid, rather than the frame, absorbs some, most, or in some instances, all of the 'shock' (essentially an energy dissipation).

On the other hand, there are those who might seek out a bumpy ride on purpose, such as those that enjoy off-roading. Off-roading is the activity of driving or riding a vehicle on unsurfaced roads or tracks, made of materials such as sand, gravel, riverbeds, mud, snow, rocks, and other natural terrain. Types of off-roading range in intensity, from leisure drives with unmodified vehicles to competitions with customized vehicles and professional drivers.

A traditional vehicle for road driving is unsuitable for off-roading. For example, if someone needed to traverse an area that required a higher or lower ground clearance than their vehicle currently had, they would need to take their vehicle to a shop, purchase a completely new suspension system, and then pay someone to replace the entire suspension system on the vehicle (which takes time and is a costly endeavor). After that, if the user wanted to return to the lower suspension height he/she would have to repeat that process in reverse, which may not be possible due to physical changes and alterations of the vehicle chassis that may have been needed to replace all of the hard components during the first conversion.

Thus, off-roaders typically look for a custom vehicle made suitable for off-roading. In some instances, an off-roader may be such an enthusiast that he/she wants to use a vehicle with an after-market modification of some kind.

For example, one might modify a vehicle with an air suspension kit, but such kits do not have the automation or features, and simply read linear or radial potentiometers to determine and adjust height.

Additionally, if you had existing air suspension equipment and were traveling with suspension at a height that offsets the vehicle center of gravity at a dangerous level, there would be no way with existing products for the vehicle to lower modify its center of gravity automatically, thereby increasing driver safety. These systems are limited in ability and features.

Since the advent of the automobile, suspension has been fixed to a specific height. There might be some flexibility within a very short range of travel of this fixed position in order to provide a smoother ride for passengers, but this range is very limited. Up to this point, to make any adjustments to suspension height requires a great deal of manual labor, expensive additional parts and extended periods of service.

What is needed is a fast and economical way to modify a vehicle with a suspension kit that is multi-purpose, easy to operate, and may easily convert a vehicle from roadway configuration to an off-road configuration (and back again).

Embodiments herein solve a lot of labor intensive and part intensive work, and opens up a much larger variety of driving experiences and terrain possibilities with the same vehicle that requiring little or no input from the user.

SUMMARY

Embodiments of the present disclosure pertain to an improved suspension kit with a multi-purpose shock absorber, and related systems, assemblies, and methods.

Embodiments herein may pertain to an air suspension kit for a vehicle that may include one or more of the following: a bumper housing for coupling to the vehicle; a shock absorber assembly for coupling between an axle and suspension of the vehicle. The absorber assembly may include: an absorber body having an outer surface; a movable piston having a first end disposed within the absorber body and a second end coupled with the axle, wherein a magnet assembly is disposed around the movable piston at the second end. There may be a sensor assembly having a sensor body coupled with the outer surface. The sensor assembly may have an inner sensor body with a hall effect sensor disposed therein.

The kit may include an air spring. The sensor assembly may be configured to detect changes in the position of the magnet assembly.

The bumper housing may include any of: an inner cavity accessible by opening a bumper door; an air compressor disposed within the inner cavity; and a control unit also disposed within the inner cavity, and operably engaged with the shock absorber assembly via a cable. There may be a speed calculation is determined based on changes in linear height of the magnet assembly.

The air control unit may be operably configured to change a height of a portion of the vehicle by activating the air compressor to fill or deflate the air spring. The air control unit may have a processor (with respective circuit board) configured to process data and send a control signal to any component of the vehicle, such as the air spring (via compressor).

The sensor assembly may have a central sensor axis. The absorber body may have a central body axis. The central sensor axis and the central body axis may be parallel to each other.

The magnet assembly may include any of: a hollow spool body comprising a flared end; a first ring magnet disposed around the hollow spool body, and engaged with the flared end.

The absorber body may have a first body end for receiving the movable piston therethrough, and a second body end for coupling the shock absorber assembly with a chassis of the vehicle, wherein the second end comprises a bushing.

Yet other embodiments of the disclosure pertain to a shock absorber assembly for a vehicle that may include: an absorber body having an outer surface; a movable piston having a first end disposed within the absorber body and a second end configured to couple with a part of the vehicle. There may be a magnet assembly is disposed around and external of the movable piston at the second end.

The absorber assembly may include a sensor assembly having a sensor body coupled with the outer surface. An inner sensor body may have a hall effect sensor disposed therein configured to detect a change in a position (e.g., linear) of the magnet assembly.

The detection of the change in the position of the magnet assembly may result in a data signal used for calculating a speed of the vehicle.

The sensor assembly may have a central sensor axis, wherein the absorber body has a central body axis, and wherein the central sensor axis and the central body axis are parallel to each other.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein:

FIG. 3A shows a longitudinal side cross-sectional view of a multi-purpose shock absorber according to embodiments of the disclosure;

FIG. 3B shows a longitudinal side cross-sectional view of a magnet assembly for use with a multi-purpose shock absorber like that of FIG. 3A according to embodiments of the disclosure;

FIG. 3C shows a side component view of the shock absorber of FIG. 3A installed on a vehicle according to embodiments of the disclosure;

DETAILED DESCRIPTION

Figures 1A, 1B:
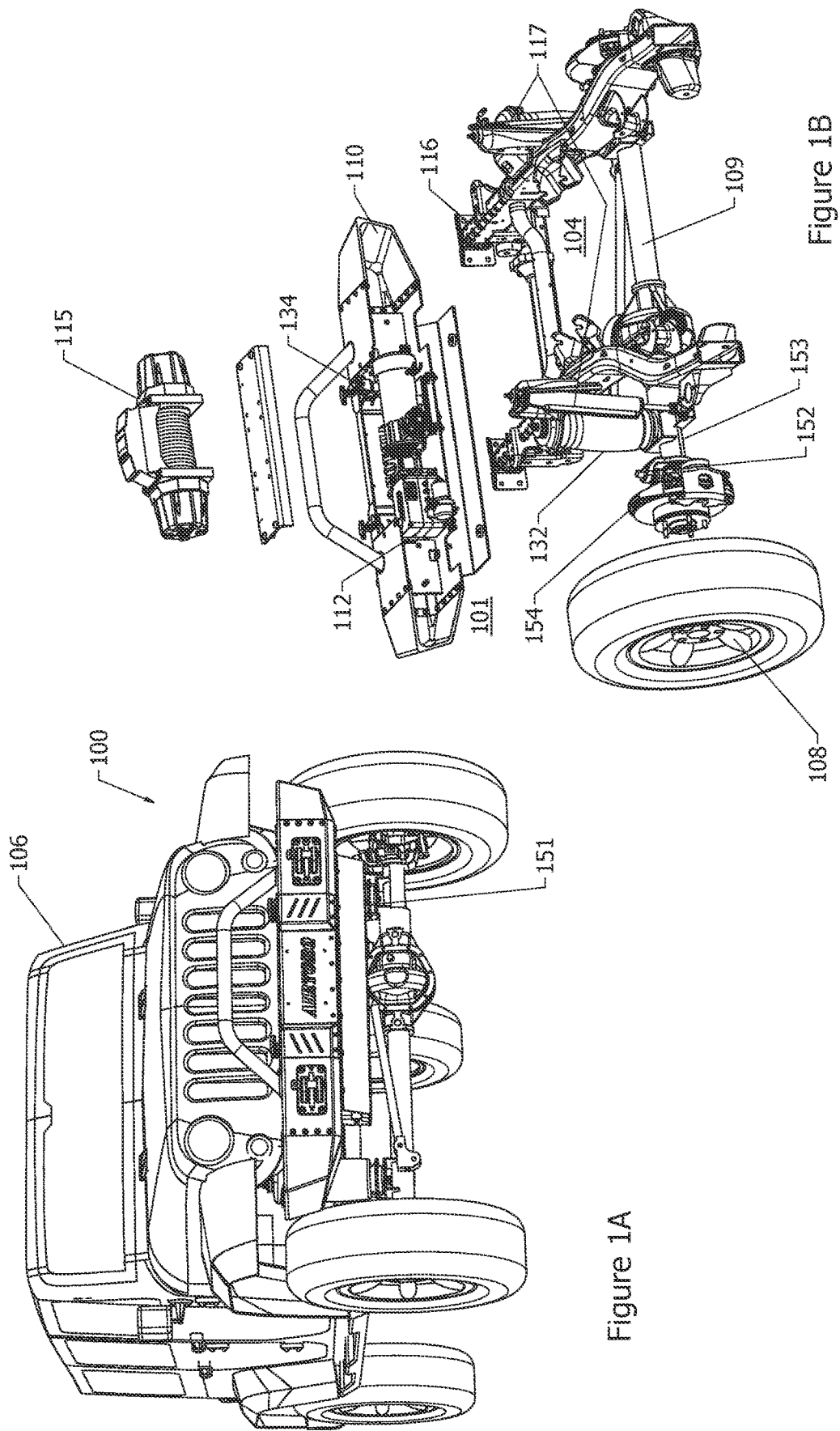
FIG. 1A shows a front view of an automobile system according to embodiments of the disclosure.
FIG. 1B shows a component view of an air suspension kit (or assembly) for an automobile system like that of FIG. 1B according to embodiments of the disclosure.

Regardless of whether presently claimed herein or in another application related to or from this application, herein disclosed are novel apparatuses, units, systems, and methods that pertain to a shock absorber, details of which are described herein.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, piping, and so forth. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

Terms

The term "connected" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "mounted" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth.

The term "fluid" as used herein may refer to a liquid, gas, slurry, single phase, multi-phase, pure, impure, etc. and is not limited to any particular type of fluid such as hydrocarbons.

The term "fluid connection", "fluid communication," "fluidly communicable," and the like, as used herein may refer to two or more components, systems, etc. being coupled whereby fluid from one may flow or otherwise be transferrable to the other. The coupling may be direct, indirect, selective, alternative, and so forth. For example, valves, flow meters, pumps, mixing tanks, holding tanks, tubulars, separation systems, and the like may be disposed between two or more components that are in fluid communication.

The term "engine" as used herein may refer to a machine with moving parts that converts power into motion, such as rotary motion. The engine may be powered by a source, such as internal combustion.

The term "motor" as used herein may be analogous to engine. The motor may be powered by a source, such as electricity, pneumatic, or hydraulic.

The term "pump" as used herein may refer to a mechanical device suitable to use an action such as suction or pressure to raise or move liquids, compress gases, and so forth. 'Pump' can further refer to or include all necessary subcomponents operable together, such as impeller (or vanes, etc.), housing, drive shaft, bearings, etc. Although not always the case, 'pump' may further include reference to a driver, such as an engine and drive shaft. Types of pumps include gas powered, hydraulic, pneumatic, and electrical.

The term "utility fluid" as used herein may refer to a fluid used in connection with the operation of a heat generating device, such as a lubricant or water. The utility fluid may be for heating, cooling, lubricating, or other type of utility. 'Utility fluid' may also be referred to and interchangeable with 'service fluid' or comparable.

The term "sensor" as used herein can refer to a device that detects or measures a physical property and may record, indicate, or otherwise respond to it. The output of a sensor can be an analog or digital signal.

The term "Hall effect sensor" as used herein may refer to a sensor with respective circuitry suitable to generate a digital signal or pulse, or work as a magnetic switch latch, based on a change in magnetic field. The sensor may include a device or element having an electric current running through it, and can further be associated with an amplifier and a trigger, or a transducer, converter, and the like. A sensor assembly may include one or more Hall effect sensors spaced apart.

The term "circuit board" (also 'printed' circuit board) as used herein can refer to a board that mechanically supports and electrically connects electronic components using conductive tracks, pads and other features. Components (e.g., capacitors, resistors, etc.) can be soldered onto the circuit board and connected via various conductivity paths.

The term "controller" or "control unit" as used herein may refer to a CPU with additional function or structure, such as RAM, ROM, and or peripherals like I/O all embedded on a single chip. The CPU may have a respective circuit board and circuitry disposed in a housing. An 'air control unit' is one that may utilize pneumatic data signals, as well control airflow.

The term "processor" as used herein may refer to a logic chip or a computer processor on a microchip. The processor may have most or all central processing unit (CPU) functions.

The term "computer readable medium" (CRM) as used herein may refer to any type of medium that can store programming for use by or in connection with an instruction execution system, apparatus, or device. The CRM may be, for example, a device, apparatus, or system based on electronic, magnetic, optical, electromagnetic, or semiconductor function. By way of further example, the CRM may include an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). There may be a USB serial port that is on this system. The USB may allow, for example, a computer to plug into the air controller and receive text messages from the system that contain diagnostic or data points for development or whatever the current development requires.

Referring now to FIGS. 1A and 1B together, a front view of an automobile system and a component view of an air suspension kit (or assembly), respectively, illustrative of embodiments disclosed herein, are shown.

FIGS. 1A and 1B show an automobile system 100 that may include a vehicle 106 configured with a suspension kit 101. While not with any limitation, the vehicle 106 may be motorized via an engine powered by a fuel source, such as gasoline, electricity, or the like. The vehicle 106 may be suitable for any type of terrain, such as paved road, gravel, or any kind of 'off road' surface.

Embodiments herein apply to the suspension kit 101 that may be an inclusive assembly of a number of components, subcomponents, etc. which may be further associated with operable systems, subsystems, assemblies, modules, and so forth that may overall be referred to as a 'kit'. Some aspects of kit 101 may be described in detail, whereas others only briefly, if at all. The kit 101 may be sized and optimized accordingly for operable coupling with any type of vehicle, and may be operable to facilitate or provide multi-terrain functionality. Any component, subcomponent, etc. may be configured for durability and for rugged environments, and as such, be waterproof, dustproof, and the like. The kit 101 may include a bumper housing, shock absorber, wiring harness, and sensor assembly.

The suspension kit 101 may be coupled to a chassis 151 via one or more mounting points 116. While not limited, an off-road enthusiast would recognize the versality of the suspension kit 101 in that the vehicle 106 may be modified or retrofitted in an after-market state (e.g., the vehicle was previously sold from a dealership, and originally without the suspension kit 101 coupled therewith, etc.).

The suspension kit 101 may be operable with one or more axles 109, with only reference to a single axle made here (any other axle may be redundantly configured). As shown in FIG. 1B, the kit 101 (e.g., one of its components) may coupled with a suspension 104 having an upper control arm 152 and/or a lower control arm 153. The control arms 152, 153 may be coupled with the axle 109 and or drum (or disc) 154, which may result in influence on direction of a wheel(s) 108.

The suspension kit 101 may include one or more shock absorbers 117, which may be in operable communication with a respective air spring 132. As a conventional vehicle is likely to come with a coil spring, the vehicle 106 may need to be modified to have the coil spring removed and the air spring 132 installed in its place.

The suspension kit 101 may come with a bumper housing 110, which may be coupled with the chassis 116. Again, as a conventional vehicle is likely to come with a traditional bumper (if any bumper), the vehicle 106 may need to be modified to have the bumper housing 110 coupled therewith.

The bumper housing 110 may be suitable to provide bumper functionality; however, the bumper housing 110 may also have one or more subcomponents housed therein, such as an air compressor 134 and a control unit 112. Although not shown here via wiring, tubing, etc., one of skill would appreciate the control unit 112 may be in operable communication with any component of the suspension kit 101. For example, the control unit 112 may have signal communication (e.g., data inputs and outputs) with the shock absorber 117. In a similar manner, the control unit 112 may be in operable communication with the air compressor 134, which may in turn be in operable (fluid) communication with the air spring 132. The control unit 112 may be completely isolated from any other vehicle control systems. On the other hand, components of the kit 101 may be powered via the vehicle battery. The off-road enthusiast may be pleased to find the bumper housing 110 may have a (powered) winch 115 disposed thereon. Although not viewable here, the suspension kit 101 may include wiring, wiring harness, etc. for power, data transfer, and the like.

Figure 2A:
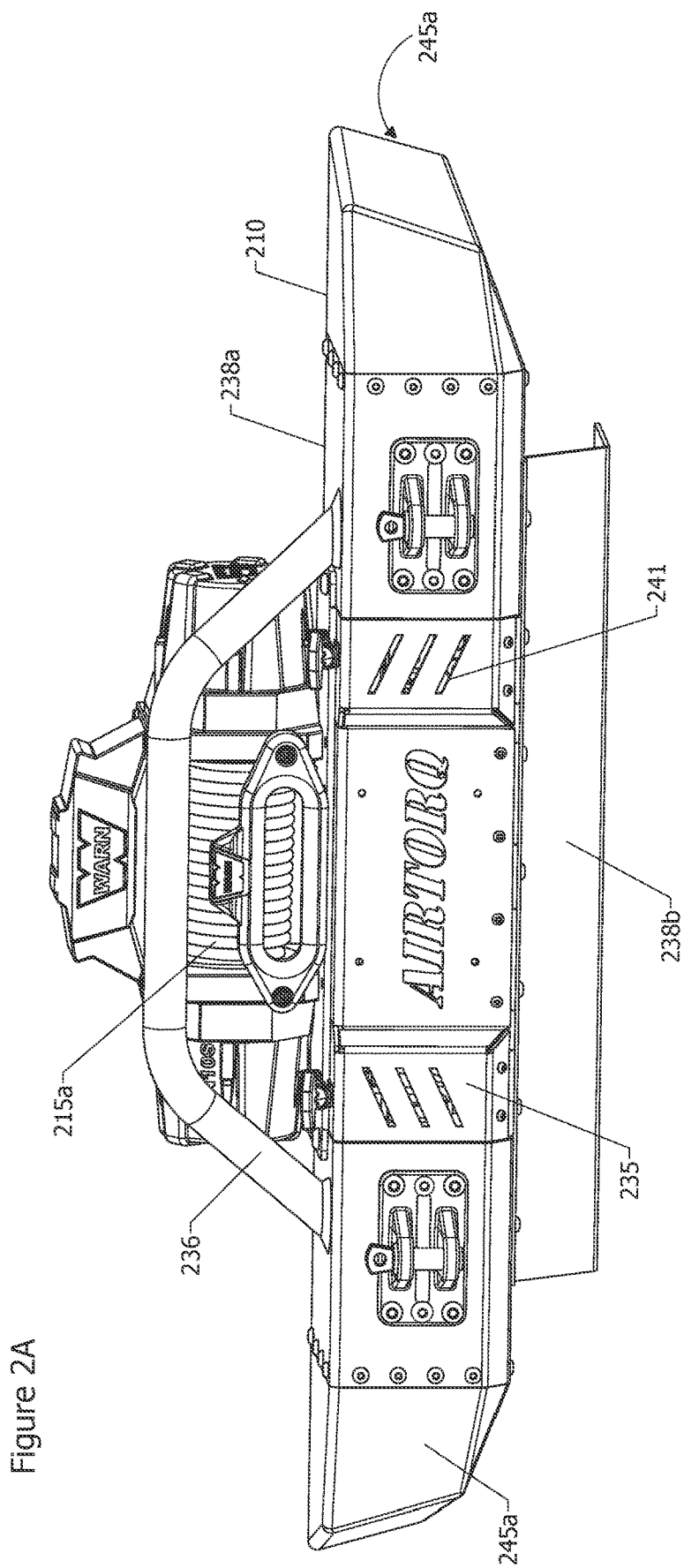
FIG. 2A shows a front 'closed door' view a bumper housing useable with an air suspension kit (or assembly) according to embodiments of the disclosure.
Figure 2B:
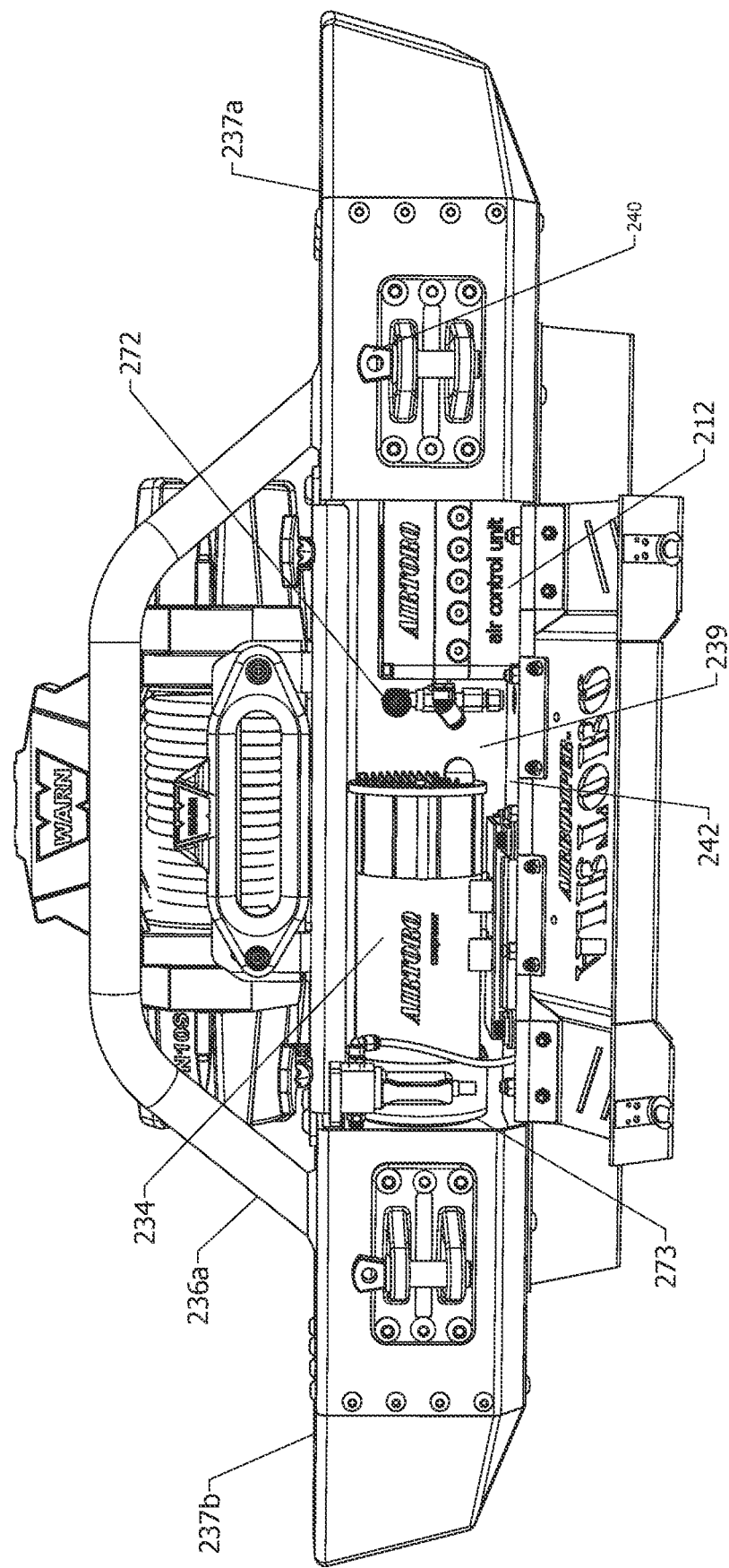
FIG. 2B shows an 'open door' view of the bumper housing of FIG. 2A according to embodiments of the disclosure.

Referring now to FIGS. 2A, 2B, 2C, and 2D together, a front 'closed door' view and an 'open door' view of a bumper housing useable with an air suspension kit (or assembly), a component view of a compressor and a control unit disposed within the bumper of FIGS. 2A and 2B, and a circuit board for the control unit, respectively, illustrative of embodiments disclosed herein, are shown.

FIGS. 2A-2D show a bumper housing 210 useable with embodiments disclosed herein. While it need not be exactly the same, the housing 210 may be like that of housing 110 or others described herein, etc., and components (or sub-components) thereof may be duplicate or analogous. Thus, only a brief discussion of the housing 210 may be provided, recognizing that differences, if any, would be discernable by one of skill in the art, especially in view of the present disclosure.

The housing 210 may be a frame-type structure made of a rugged, durable material, such as metal or carbon fiber. The housing 210 may have a first side 237a and a second side 237b, a top side 238a and a bottom side 238b, as well as a frontward (outward facing) side 245a and a rearward (inward facing) side 245b.

The bumper housing 210 may have an inner cavity 239 protectable via a moveable door 235. For example, the door 235 may be pivotably coupled with the housing 210. In embodiments, the door 235 may have one or more vents 241. FIGS. 2A and 2B show the door 235 in a closed and open position, respectively.

The door 235 provides protection against components disposed within the cavity 239, such as an (air) compressor 234 and a (air) control unit 212. There may also be a fluid storage tank (such as an air tank) disposed within the cavity 239 (not viewable here). The ability to open the door 235 then facilitates easy access to components within the housing 210. The door 235 may be secured closed, such as by snug tolerance fit between the door 235 and the housing 210, while other devices may be used, such as latches, clips, etc. So that an air signal may be received when the door 235 is closed (such as via air tube 256), there may be one or more slits or openings 241.

In addition or in the alternative to a separate storage tank, the bumper 210 itself may be configured to store air. For example, there may be an inner chamber within sidewall 273 that may be in fluid communication with the compressor 234, and/or the handle 236 may have a hollow or handle chamber within sidewall 236a that may be in fluid communication with the compressor 234 and the inner chamber. As such, there may be an air bleed 272 suitable for use as an air source. For example, an air hose may be coupled to the bleed 272, and a device (such as a tire) may be filled with air. The compressor 234 may be operable to autofill, such as based on a level or pressure reading. The compressor 234 may be in operable communication with one or more of air springs (332, FIG. 3C).

Figure 2D:
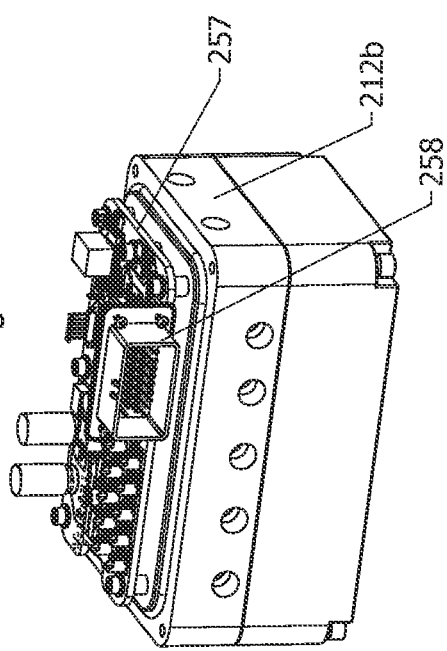
FIG. 2D shows a circuit board for a control unit like that of FIG. 2C according to embodiments of the disclosure.
Figure 2C:
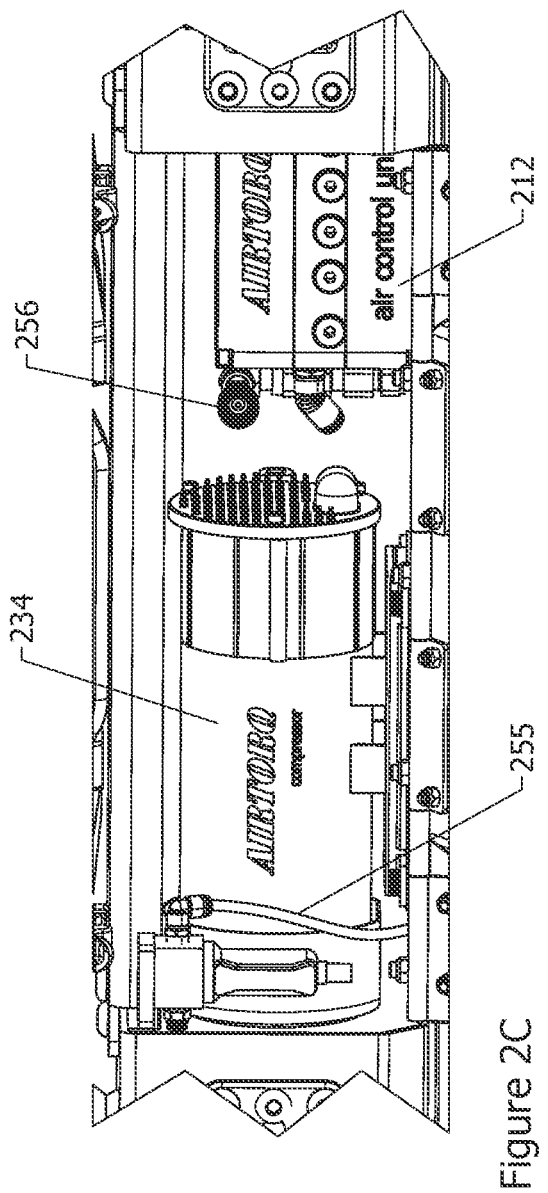
FIG. 2C shows a component view of a compressor and a control unit disposed within the bumper of FIGS. 2A/2B according to embodiments of the disclosure.

Within the cavity 239 there may be a floor or base 242, for which one or more of the aforementioned components may be (securely) disposed thereon, such as via welding, nut/bolt, clamp, screws, and the like. For example, FIG. 2C shows an up-close view of the compressor 234 and the control unit 212 mounted thereon.

The control unit 212 may be in operable communication with one or more components described herein, such as a shock assembly and the compressor 234. As shown in FIG. 2D, the control unit 212 may have a processor and other circuit equipment in signal and operable communication with kit (101). The circuit board 257 may be installed within the unit with the data plug 258, board 257, unit wiring, etc. The circuit board may be protected within an air unit cover coupled with a base. The processor may be configured or otherwise operably programmed (such as with computer instructions) for processing or otherwise using data (signals, etc.) from the sensor assembly (323). The sensor assembly may couple with the plug 258.

The control unit 212 may provide an auto-leveling function to the vehicle (106) as a result of data received from a vehicle sensor. The control unit 212 may reduce the height of the vehicle as a result of data received from a vehicle sensor. The data received may be related to speed calculated by way of changes in vehicle height. In embodiments, the control unit 212 may be operable with a setpoint, whereby the control unit 212 may reduce the height of the vehicle when the setpoint is exceeded. The control unit 212 may prevent increases in the height until the setpoint is no longer exceeded.

FIG. 2D shows the cover removed from the base 212b. Any component of the bumper housing 210 may have wiring, tubing, etc. (see, e.g., 255 operatively associated therewith as may be needed to provide the desired functionality of the kit (101). Connections may be for electrical signal, pneumatic signal, fluid transfer, and the like.

The bumper housing may have a (powered) winch 215 (with cable 215a) disposed thereon, such as on the top side 238a (or a respective panel thereof). There may also be a support handle 236 (which may be usable as a push bar, air tank, or both). There may be one or more eyelets 240. The eyelets 240 may be configured for coupling a tow strap (or comparable), whereby the vehicle (106) may now be pulled by (or pull) another vehicle.

Referring now to FIGS. 3A, 3B, 3C, and 3D together, a longitudinal side cross-sectional view of a shock absorber, a longitudinal side cross-sectional view of a magnet assembly, a side component view of a shock absorber installed on a vehicle, and a top-down view of a control panel respectively, illustrative of embodiments disclosed herein, are shown.

FIGS. 3A-3D show a shock absorber 317 useable with embodiments disclosed herein. While it need not be exactly the same, the shock absorber 317 may be like that of shock 117, or others described herein, etc., and components (or subcomponents) thereof may be duplicate or analogous. Thus, only a brief discussion of the shock absorber 317 may be provided, recognizing that differences, if any, would be discernable by one of skill in the art, especially in view of the present disclosure.

The shock absorber 317 may be part of an overall suspension system (104), as well as part of air suspension kit (101), for use with a vehicle system (100). The shock absorber 317 may have an absorber housing 321, which may be a cylindrical type structure made of a rugged, durable material, such as metal or carbon fiber. One or more components of the shock absorber 317 may be aluminum or other type of non-ferrous material.

Figure 4B:
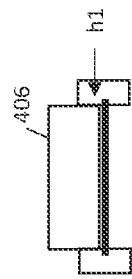
FIG. 4B shows a simplified block diagram view of vehicle having a reduced height according to embodiments of the disclosure.
Figure 4A:
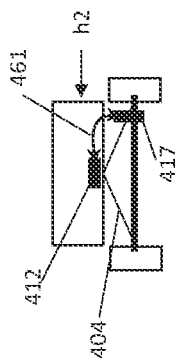
FIG. 4A shows a simplified block diagram view of vehicle having an elevated height according to embodiments of the disclosure.

Referring briefly to FIGS. 4A and 4B together, a simplified block diagram view of vehicle having an elevated height and a reduced height, respectively, illustrative of embodiments disclosed herein, are shown.

FIGS. 4A and 4B show a vehicle 406 moving (driven) with an elevated height h2. The vehicle 406 may be configured with a suspension kit (e.g., 101) as described herein. An air controller 412 may be programmed with one or more parameters or set points related to vehicle operation or performance. For example, the controller 412 may be programmed to take a corrective action based on the speed of the vehicle 406 at the height h2. The controller 412 may receive information via communication 461 about the vehicle speed based on readings obtained from the shock assembly 417. In the event the setpoint is exceeded, the air controller 412 may provide a signal to the kit in order to reduce the height of the vehicle to a safe height h1.

Figure 3D:
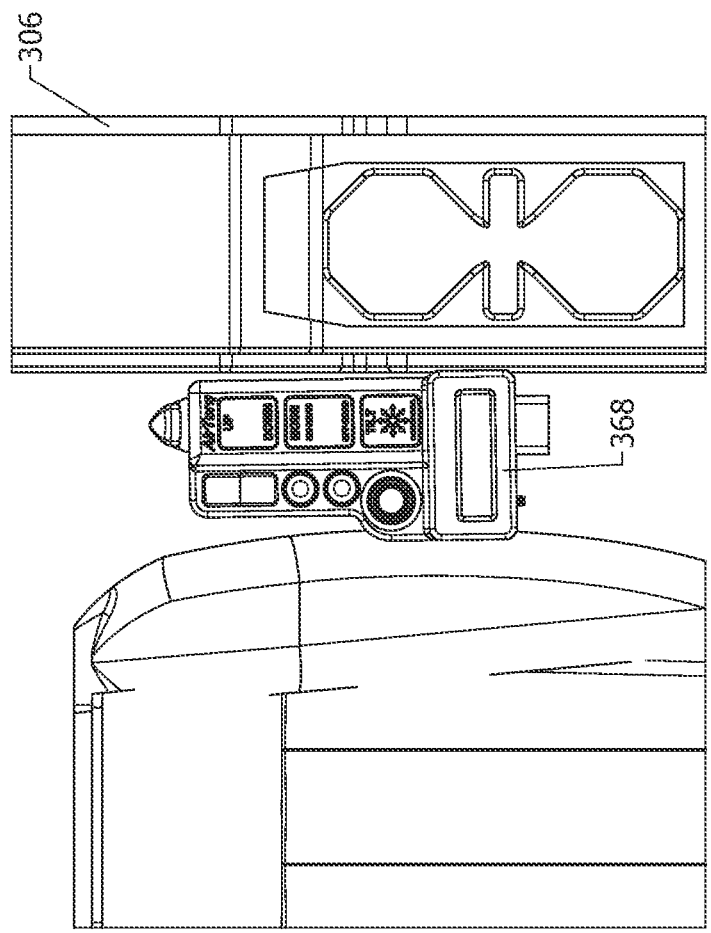
FIG. 3D shows a component view of a control panel installed on a vehicle according to embodiments of the disclosure.

Returning again to FIGS. 3A to 3D, as shown, the absorber 317 may have an (longitudinal) axis 325). The absorber housing 321 may have a first end 359a and a second end 359b. While it need not be limited, the first end 359a may be open (but otherwise enclosed by a cap or plug 362, while the second end 359b may have an integral enclosure. The second end 359b may be configured for coupling to or otherwise being engaged with a chassis, suspension, etc. For example, FIG. 3C shows (partially) the second end 359b engaged with the suspension 304 (or other part of chassis).

In embodiments, there may be a bushing 371 proximate to the second end 359b. The bushing 371 may be a pliable material, such as rubber, and thus have some amount of flexibility. Yet the bushing 371 may be rigid enough to prevent problems that may otherwise arrive by having the housing 324 on the side of the absorber housing surface 322. As the absorber 317 may have a degree of rotational movement, the assembly 323 may be susceptible to hit other parts of the vehicle; however, the bushing 371 may prevent or mitigate this.

The bushing 371 may have a first hole for accommodating fitting around a bolt or other part of the chassis fastener. The bushing 371 may have a guide hole 371a for fitting the wiring 329 therethrough. Holding the wiring in place 329 may keep it from dangling, being damaged or wrapped up against another component.

The absorber 317 may have an absorber rod or piston 318 movingly coupled with the housing 321. A first end 318a of the rod 317 may be external of the housing 321, while a second end 318b may be (movably) disposed within the housing 321. FIG. 3A shows the second end 318b may be disposed within the housing 321 in a suitable manner to form a fluid chamber 360 (which may be filled with hydraulic fluid, compressible fluid, or the like). There may be a first fluid chamber 360 and a second fluid chamber 360a. Any of the chambers 360, 360a may be filled with a fluid. For example, the first fluid chamber 360 may have a first fluid (such as a compressible, inert gas like nitrogen), and the second fluid chamber 360a may have a second fluid (such as an incompressible liquid, like oil).

On the other hand, FIG. 3C shows an eye mount 364 of the first end 318a may be coupled with the suspension 304 (or other part of chassis). The rod 318 may have a magnet assembly 319 disposed therearound. For example, the magnet assembly 319 may be held in place on the second end 318b of the rod 318. The magnet assembly 319 may be held in place via adhesion, glue, etc. with a surface or portion 398 of the shock 317. FIG. 3B shows the magnet assembly 319 may include a spool or hollowed shaft 319a, whereby one or more magnets 365 may be disposed therearound. The magnets 365 may be ring magnets. The magnet 365 may abut against a shouldered or flared end 319b. An end piece (such as a nut) 366 may be engaged with the spool shaft 319a in a manner suitable enough to hold the magnet(s) 365 in place.

An outer surface 322 of the absorber housing 321 may have a sensor assembly 323 coupled therewith. Although not shown here, the housing 321 and the sensor assembly 323 may be formed integral with each other as a single body. The sensor assembly 323 may have a generally tubular body 324 with its own (longitudinal) axis 326. The sensor assembly 323 may be coupled with the housing 321 in a manner whereby the axis 326 is parallel to shock absorber axis 325. The same holds whether on a longitudinal or an azimuth. One of skill would appreciate that 'parallel' may be to the eye or to a feasible tolerance, but without exact mathematical precision to an infinite decimal.

The assembly 323 may have a sensor 324a. The sensor 324a may be a Hall Effect sensor, and thus configured to provide a reading (i.e., signal) based on location or movement of the magnet assembly 319. The sensor 324a may be a plurality of hall effect sensors 370 spaced apart incrementally along (and within) the body 324). Signal transfer may be between the sensor assembly 323 and an air control unit (212) via wiring 330. The wiring 330 may provide for bi-directional data transfer 361 therebetween. In embodiments, the signal from the sensor assembly 323 may be an output (to the control unit [212]).

Based on programming and real-time readings, the control unit may then send a control signal to an air compressor (234), which then results in inflation/deflation of an air spring(s) 332. FIG. 3D shows an additional or alternative way of controlling (or adjusting) suspension kit operation. For example, a user activated control pad 368 may be used to provide various commands to components within the kit (101). For example, the control pad 368 may provide an operator the ability to increase or decrease height of the vehicle, and/or tilt angle.

Additional understanding of operation of embodiments herein now follows.

Sensor Operation—Speed Calculation

Embodiments herein may utilize the hall effect sensor assembly 323 configured in a manner to read changes in height (linearly) as the shock 317 (and thus magnet assembly 319) travels up and down through the normal course of suspension operation as the vehicle moves over any terrain. This may provide for the ability to read or otherwise measure the frequency of vibration as the vehicle moves over a surface. Embodiments herein may provide for reading pressure, changes in pressure, changes in height, and vibration.

Even on a perfectly flat surface the suspension kit (and thus the vehicle) will still have a waveform produced at multiple measurable frequencies that may be predetermined. One of these in particular is to allow determination what type of surface the vehicle is traveling over and also at what speed the vehicle is traveling.

As the suspension, tires, road surface and everything else creates a harmonic frequency, the changes are measured by the sensor assembly 323 (in operable communication with ACU 312), and thus this data may be compared in time segments to past frequencies, such that a determination of many details about the vehicle condition and status may be known or calculated (or approximated).

The sensor 324a may be configured to read changes associated with movement of the magnet assembly 319, which may be disposed within the shock absorber 317. The sensor 324a may include one or more hall effect sensors 370 spaced apart incrementally within body or housing 324.

The movement of the magnet assembly may result in a measurable (electrical) signal that may then be sent via wire or wirelessly the ACU (212). The ACU may be operable and programmed to analyze and interpret the signal data on an intermittent or ongoing and continuous basis.

The computer 312 may receive signal data transmitted by the sensor shock assembly 323 and can on its own, within a predetermined and defined set of rules, make changes to the vehicle suspension system. In embodiments, the ACU control may be completely isolated from other vehicle control aspects. That said, in other embodiments, the ACU may potentially make changes to any other electrical component of a vehicle.

As a working example of embodiments herein, the suspension kit (101) of the present disclosure may be able to detect one or more wheels has become bent or damaged, or if you have lost wheel balance or a wheel. This facilitates operator knowledge as to which wheel may require attention or maintenance, and thus know to get it repaired. Additionally this system may perform calculations suitable to detect an air suspension system leak and may on its own test the system to identify the extent of the leak and pinpoint which component has the failure. The system may provide notification to an operator via a display screen that one or more components of the vehicle has suffered damage and may need to repair this part of the vehicle.

The system may then make changes to the remaining functioning parts of the suspension system in order to support the weight of the vehicle to allow the vehicle driver to still drive at low speed to make it to a repair shop or back home, and may thus prevent one from being stranded in the wilderness or a city or anywhere, otherwise away from help.

The system may be operably configured to determine how many passengers may be riding in the vehicle based on changes in vehicle weight, or determine decreased or increased aggressiveness driving, which may then cause the suspension to change fluid viscosity and either be stiffer or softer depending on what type of ride quality is needed for how the vehicle is being used, and may be by screw, nut/bolt, weld, and so forth.

Embodiments herein are beyond common sense or predictable results based on the unexpected configuration of components, the type of data being recorded, and the way in which the data is analyzed and put to use.

Up to this point in the marketplace, attention has been on suspension height readings, which in turn are used to make changes to suspension height only.

Advantageously, embodiments herein provide for utilizing a different, thus previously unutilized waveform frequency produced by the type of magnet and sensor assembly described herein. Operating together, the sensor assembly 323 and the magnet assembly 319 may be configured to determine much more than simply ride height. For example, the assembly 323 may detect changes in the driveline, such as a faulty harmonic balancer or engine misfire. Embodiments may detect transmission issues, wheel and tire issues, basically anything with the rolling assembly, road surface changes, or anything that would be carried inside the vehicle and create weight, all combined.

As the sensor assembly 323 may provide waveform readings from vibration frequency, these can be caused and altered by a wide variety of components and factors, much broader in terms of data collection and data usage than simply reading suspension ride height or driveline revolutions. This signal data may facilitate the ability to affect many different functions of the vehicle, from safety features to conveniences, or notifying an operator of component failure or rolling assembly damage.

Using this technology you would be able to increase your ground clearance or decrease your ground clearance manually or automatically, either completely hands-free or simply with the push of a button, thereby increasing driver safety, preventing driver and vehicle from becoming stuck in rough Terrain or from being disabled due to some types of vehicle damage and being able to traverse additional train that was previously prohibitive to fixed height suspension. Additionally this technology adds intelligent automated hands-free decision-making via computer by utilizing frequency analysis. This technology can determine if the vehicle is parked, sitting still with the engine running or turned off or driving and can also tell at what speed the car is traveling and over what type of terrain. Being able to collect and analyze this data allows for many additional features to enhance the driving capabilities and experience while maintaining completely hands-free ease-of-use for the driver.

There are parameters of the control system that may be utilized and are better served by knowing the current physical status of the vehicle so the ACU may make decisions and adjust the operation accordingly. Knowing, for example, how fast the vehicle is traveling, if the vehicle is driving in On-Road or Off-Road conditions, if the vehicle is parked at a stoplight, etc. the ACU may make decisions about the functionality enhancing the overall user experience dynamically while using this product.

In embodiments, the kit may include one or more sensors that respectively connected to the shocks of the vehicle being evaluated. These sensor assemblies may be connected to a controlling central processing unit (CPU) of the ACU that provides them conditioned power and reads the resulting signal from each corner of the vehicle. The basic control system may keep suspension heights within limits of the setpoints chosen by the user by making adjustments on the control pad 368 (also in operable communication with the ACU, such as via wiring or wireless).

In some aspects, there may be some setpoints an operator may choose that may result in "unsafe" driving conditions. Accordingly, the ACU may be operably configured in a manner to find or otherwise detect these driving conditions within signal data, such that the ACU may override the current setpoints to assure that the vehicle remains driving in "safe" conditions.

Embodiments herein may use a "band pass" filter that is adjusted to the resonant frequency of the vehicle and looks for deviations from that signal to determine when the vehicle is traveling off road. Embodiments herein may utilize the peak-to-peak height of the resulting AC signal that is "riding" on top of the DC height signal to determine that the vehicle is driving as this resulting resonant frequency will appear on top of the height signal while the vehicle is in motion. Additionally, the embodiments herein may look for "excursions" within that signal to be above a pre-determined height percent of the average resonant signal to determine that the vehicle is driving in off-road conditions and it will make adjustments to the dynamic control of the system accordingly.

The resulting resonant frequency of the vehicle that will occur when driving can change dramatically depending on physical influences on the vehicle. Some examples of these physical influences can be (but are not limited to): Tire size and tread, Vehicle height, Road conditions, Driving speed, Driving style.

The suspension kit of the present disclosure may be installed into various types and sizes of vehicles with differing options. As such, the system may be operable to seek or detect dynamic differences in the resulting signals relative to each other to determine what state the vehicle is in and how to adjust operational parameters to keep the driving experience safe for the user.

As stated above, this system has the advantage of not being "tuned" to be specific to a certain type of vehicle with specific accessories installed on that vehicle. This system uses mathematical averages dynamically to look for outliers in the general dynamic operation of the system to determine when there are deviations in the driving experience, and if the conditions are such that the system needs to be adjusted to make it safer for the user, the system will make those adjustments. Additionally, these same data points can be used to determine if there are just similarities in the resulting signals that are being caused by other driving conditions and that the switching of operating modes should be suppressed until a positive determination can be made.

Advantages

You could use existing rotating magnetic sensors to detect speed and perform a portion of the functions of our innovation, but it could not perform all of the functions. You could use other height sensing technology to perform a portion of our features, but it could not perform all of the functions. Our system performs all of those functions and more with one system. How it works differently from other devices and processes is that it is reading vibration frequency wave forms.

Traditional speed sensing technology has a sensor that reads a point rotating on a drive shaft or similar device to read engine RPM and miles per hour by counting revolutions. Current height sensing technology uses radial or linear potentiometers to simply read high and low variances in suspension travel. Our system is reading the high frequency signatures within the "noise" riding on the height signal, which is able to provide many more data points in a given sampling then either of the current existing systems and therefore allows us to determine many other aspects of the vehicle status.

While preferred embodiments of the disclosure have been shown and described, modifications thereof may be made by one skilled in the art without departing from the spirit and teachings of the disclosure. The embodiments described herein are exemplary only and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. An air suspension kit for a vehicle comprising:
   a bumper housing for coupling to the vehicle;
   a shock absorber assembly for coupling between an axle and suspension of the vehicle, the absorber assembly further comprising:
      an absorber body having an outer surface;
      a movable piston having a first end coupled with the axle and a second end disposed within the absorber body,
      wherein a magnet assembly is disposed around the movable piston at the second end;
   a sensor assembly having a sensor body coupled with the outer surface, wherein an inner sensor body has a hall effect sensor disposed therein; and an air spring,
wherein the sensor assembly is configured to detect changes in the position of the magnet assembly.

2. The air suspension kit of claim 1, wherein the bumper housing further comprises:
an inner cavity accessible by opening a bumper door;
an air compressor disposed within the inner cavity; and
a control unit also disposed within the inner cavity, and operably engaged with the shock absorber assembly via a cable, whereby a speed calculation is determined based on changes in linear height of the magnet assembly.

3. The air suspension kit of claim 2, wherein the air control unit is operably configured to change a height of a portion of the vehicle by activating the air compressor to fill or deflate the air spring.

4. The air suspension kit of claim 2, wherein the sensor assembly has a central sensor axis, wherein the absorber body has a central body axis, and wherein the central sensor axis and the central body axis are parallel to each other.

5. The air suspension kit of claim 2, wherein the magnet assembly comprises:
a hollow spool body comprising a flared end; and
a first ring magnet disposed around the hollow spool body, and engaged with the flared end.

6. The air suspension kit of claim 2, wherein the absorber body has a first body end for receiving the movable piston therethrough, and a second body end for coupling the shock absorber assembly with a chassis of the vehicle, wherein the second body end comprises a bushing.

7. A shock absorber assembly for a vehicle, the shock absorber assembly comprising:
an absorber body having an outer surface;
a movable piston having a first end configured to couple with a part of the vehicle and a second end disposed within the absorber body, wherein a magnet assembly is disposed around and external of the movable piston at the second end; and
a sensor assembly having a sensor body coupled with the outer surface, wherein an inner sensor body has a hall effect sensor disposed therein configured to detect a linear change in a position of the magnet assembly.

8. The shock absorber assembly of claim 7, wherein the detection of the linear change in the position of the magnet assembly results in a data signal used for calculating a speed of the vehicle.

9. The shock absorber assembly of claim 7, wherein the sensor assembly has a central sensor axis, wherein the absorber body has a central body axis, and wherein the central sensor axis and the central body axis are parallel to each other.

10. The shock absorber assembly of claim 7, wherein the magnet assembly comprises:
a hollow spool body comprising a flared end; and
a first ring magnet disposed around the hollow spool body, and engaged with the flared end.

11. The shock absorber assembly of claim 10, wherein the absorber body has a first body end for receiving the movable piston therethrough, and a second body end for coupling the shock absorber assembly with a chassis of the vehicle, wherein the second body end comprises a bushing.

12. An air suspension kit for a vehicle comprising:
a bumper housing for coupling to the vehicle, the bumper housing further comprising:
an inner cavity accessible by opening a bumper door;
an air compressor disposed within the inner cavity;
a control unit also disposed within the inner cavity;
a shock absorber assembly for coupling between an axle and suspension of the vehicle, the absorber assembly further comprising:
an absorber body having an outer surface;
a movable piston having a first end coupled with the axle and a second end disposed within the absorber body,
wherein a magnet assembly is disposed around the movable piston at the second end;
a sensor assembly having a sensor body coupled with the outer surface, wherein an inner sensor body has a hall effect sensor disposed therein; and
an air spring,
wherein the control unit is operably engaged with the shock absorber assembly via a cable, wherein the sensor assembly is configured to detect changes in the linear position of the magnet assembly, wherein a speed calculation is determined based on changes in linear height of the magnet assembly.

13. The air suspension kit of claim 12, wherein the air control unit is operably configured to change a height of a portion of the vehicle by activating the air compressor to fill or deflate the air spring.

14. The air suspension kit of claim 13, wherein the sensor assembly has a central sensor axis, wherein the absorber body has a central body axis, and wherein the central sensor axis and the central body axis are parallel to each other.

15. The air suspension kit of claim 14, wherein the magnet assembly comprises:
a hollow spool body comprising a flared end; and
a first ring magnet disposed around the hollow spool body, and engaged with the flared end.

16. The air suspension kit of claim 15, wherein the absorber body has a first body end for receiving the movable piston therethrough, and a second body end for coupling the shock absorber assembly with a chassis of the vehicle, wherein the second body end comprises a bushing.

17. The air suspension kit of claim 16, wherein the cable is disposed through the bushing.

* * * * *